US010635583B2

(12) United States Patent
Hsiao et al.

(10) Patent No.: US 10,635,583 B2
(45) Date of Patent: Apr. 28, 2020

(54) MEMORY MANAGEMENT METHOD AND STORAGE CONTROLLER

(71) Applicant: Shenzhen EpoStar Electronics Limited CO., Shenzhen (CN)

(72) Inventors: Yu-Hua Hsiao, Hsinchu County (TW); Hung-Chih Hsieh, Hsinchu County (TW)

(73) Assignee: Shenzhen EpoStar Electronics Limited CO., Shenzhen (CN)

( * ) Notice: Subject to any disclaimer, the term of this patent is extended or adjusted under 35 U.S.C. 154(b) by 0 days.

(21) Appl. No.: 16/137,523

(22) Filed: Sep. 20, 2018

(65) Prior Publication Data

US 2020/0042440 A1 Feb. 6, 2020

(30) Foreign Application Priority Data

Aug. 1, 2018 (TW) .............................. 107126692 A

(51) Int. Cl.
*G06F 3/06* (2006.01)
*G06F 12/02* (2006.01)

(52) U.S. Cl.
CPC ........ *G06F 12/0269* (2013.01); *G06F 3/0608* (2013.01); *G06F 3/0652* (2013.01); *G06F 3/0659* (2013.01); *G06F 3/0679* (2013.01); *G06F 2212/1024* (2013.01); *G06F 2212/1044* (2013.01); *G06F 2212/7205* (2013.01)

(58) Field of Classification Search
CPC combination set(s) only.
See application file for complete search history.

(56) References Cited

U.S. PATENT DOCUMENTS

| 8,832,356 | B2 | 9/2014 | Baek et al. |
| 8,904,090 | B2 | 12/2014 | Baek et al. |
| 2015/0261797 | A1 | 9/2015 | Alcantara et al. |
| 2017/0315925 | A1* | 11/2017 | Yeh ..................... G06F 12/1009 |

OTHER PUBLICATIONS

"Office Action of Taiwan Counterpart Application", dated Dec. 30, 2019, p. 1-4.

* cited by examiner

*Primary Examiner* — Yong J Choe
(74) *Attorney, Agent, or Firm* — JCIPRNET

(57) ABSTRACT

A memory management method is provided. The method includes in response to completion of a garbage collection operation, identifying one or more recycled block stripes subjected to the garbage collection operation among a plurality of block stripes of a rewritable non-volatile memory module; updating a garbage collection information table in a buffer memory according to the one or more recycled block stripes; and writing the garbage collection information table into the rewritable non-volatile memory module.

10 Claims, 5 Drawing Sheets

MEMORY MANAGEMENT METHOD AND STORAGE CONTROLLER

CROSS-REFERENCE TO RELATED APPLICATION

This application claims the priority benefit of Taiwan application serial no. 107126692, filed on Aug. 1, 2018. The entirety of the above-mentioned patent application is hereby incorporated by reference herein and made a part of this specification.

BACKGROUND OF THE DISCLOSURE

Field of the Disclosure

The disclosure relates to a memory management method, and more particularly to a memory management method and a storage controller adapted for a storage device equipped with a rewritable non-volatile memory module.

Description of Related Art

Generally, a storage controller of a storage device equipped with a rewritable non-volatile memory module performs a garbage collection operation to move valid data in a plurality of source physical blocks to a plurality of new physical blocks, and erases the plurality of source physical blocks to release the space occupied by invalid data of the plurality of source physical blocks.

Typically, in a process of performing a garbage collection operation by a plurality of physical blocks, when there is any information change in the plurality of physical blocks, a snapshot operation is performed to save the information of the plurality of physical blocks originally maintained in a buffer memory and corresponding to the performed garbage collection operation into the rewritable non-volatile memory module. As a result, during the execution of the garbage collection operation, a large amount of time is consumed because the snapshot operation is frequently performed, which causes a significant delay of the storage device.

In view of the above, how to save the information of the garbage collection operation more efficiently to reduce the delay caused by performing the garbage collection operation and thereby improving the operation efficiency of the storage device is one of subjects studied by those skilled in the art.

SUMMARY OF THE DISCLOSURE

The disclosure provides a memory management method, capable of recording a recycled physical block subjected to the garbage collection operation into a garbage collection information table and writing the garbage collection information table into a rewritable non-volatile memory module only when the garbage collection operation is completed, and updating the garbage collection information table according to whether a plurality of recycled physical blocks recorded in the garbage collection information table are used. In addition, the memory management method may also perform a recovery operation when a power-off event occurs to recover the garbage collection information table.

An embodiment of the disclosure provides a memory management method, adapted for a storage device equipped with a rewritable non-volatile memory module, wherein the rewritable non-volatile memory module has a plurality of physical blocks. The plurality of physical blocks are grouped into a plurality of block stripes. The method includes, in response to completion of a garbage collection operation, identifying one or more recycled block stripes subjected to the garbage collection operation among the plurality of block stripes; updating the garbage collection information table in a buffer memory according to the one or more recycled block stripes; and writing the garbage collection information table into the rewritable non-volatile memory module.

An embodiment of the disclosure provides a storage controller for controlling a storage device equipped with a rewritable non-volatile memory module. The storage controller includes: a connection interface circuit, a memory interface control circuit, a garbage collection management circuit unit and a processor. The connection interface circuit is coupled to a host system. The memory interface control circuit is coupled to the rewritable non-volatile memory module, wherein the rewritable non-volatile memory module has a plurality of physical blocks, and the plurality of physical blocks are grouped into a plurality of block stripes. The processor is coupled to the connection interface circuit, the memory interface control circuit and the garbage collection management circuit unit. The garbage collection management circuit unit is configured to, in response to completion of a garbage collection operation, identify one or more recycled block stripes subjected to the garbage collection operation among the plurality of block stripes, wherein the garbage collection management circuit unit is further configured to update the garbage collection information table in a buffer memory according to the one or more recycled block stripes. The processor instructs the memory interface control circuit to write the garbage collection information table into the rewritable non-volatile memory module.

Based on the above, the memory management method and the storage controller provided by the embodiments of the disclosure are capable of recording a recycled physical block subjected to the garbage collection operation into a garbage collection information table and writing the garbage collection information table into a rewritable non-volatile memory module only when in response to that the garbage collection operation is completed. In this manner, the operation efficiency of the storage device may be improved.

In order to make the aforementioned features and advantages of the disclosure more comprehensible, embodiments accompanying figures are described in detail below.

DESCRIPTION OF EMBODIMENTS

In the embodiment, a storage device includes a rewritable non-volatile memory module and a storage device controller (a.k.a. a storage controller or a storage control circuit). Also, the storage device is usually used together with a host system so the host system can write data into or read data from the storage device.

Figure 1:
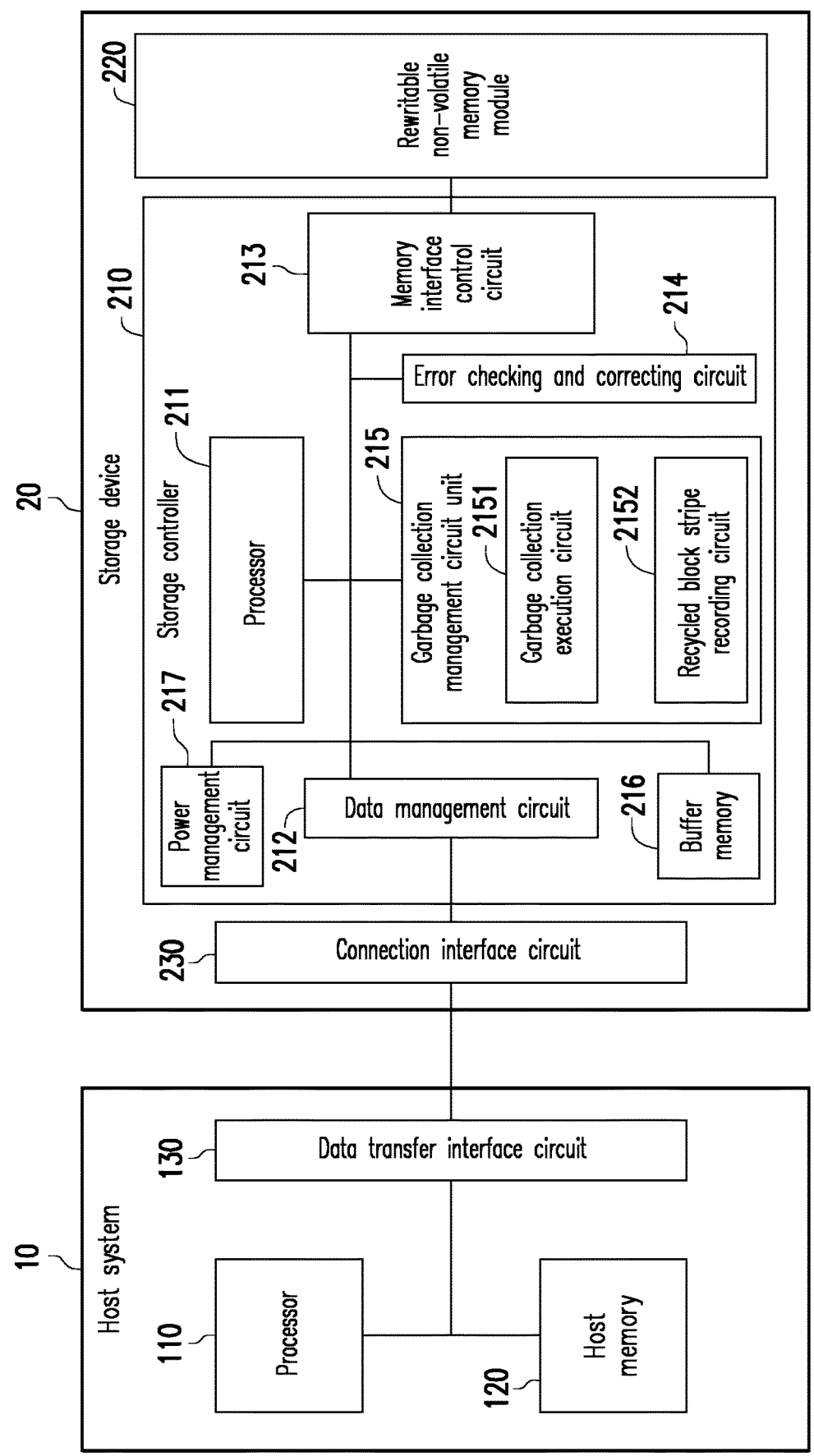
FIG. 1 is a block diagram illustrating a host system and a storage device according to an embodiment of the disclosure.

FIG. 1 is a block diagram illustrating a host system and a storage device according to an embodiment of the disclosure.

With reference to FIG. 1, a host system 10 includes a processor 110, a host memory 120 and a data transfer interface circuit 130. In this embodiment, the data transfer interface circuit 130 is coupled to (or, electrically connected to) the processor 110 and the host memory 120. In another embodiment, the processor 110, the host memory 120 and the data transfer interface circuit 130 are coupled to one another by utilizing a system bus.

A storage device 20 includes a storage controller 210, a rewritable non-volatile memory module 220 and a connection interface circuit 230. Among them, the storage controller 210 includes a processor 211, a data management circuit 212 and a memory interface control circuit 213.

In this embodiment, the host system 10 is coupled to the storage device 20 through the data transfer interface circuit 130 and the connection interface circuit 230 of the storage device 20 to perform a data accessing operation. For example, the host system 10 can store data to the storage device 20 or read data from the storage device 20 through the data transfer interface circuit 130.

In the embodiment, the processor 110, the host memory 120 and the data transfer interface circuit 130 may be disposed on a main board of the host system 10. The number of the data transfer interface circuit 130 may be one or more. Through the data transfer interface circuit 130, the main board may be coupled to the storage device 20 in a wired manner or a wireless manner. The storage device 20 may be, for example, a flash drive, a memory card, a solid state drive (SSD) or a wireless memory storage device. The wireless memory storage device may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board may also be coupled to various I/O devices including a GPS (Global Positioning System) module, a network interface card, a wireless transmission device, a keyboard, a monitor and a speaker through the system bus.

In this embodiment, the data transfer interface circuit 130 and the connection interface circuit 230 are an interface circuit compatible with a Peripheral Component Interconnect Express (PCI Express) interface standard. Further, a data transfer is performed between the data transfer interface circuit 130 and the connection interface circuit 230 by using a communication protocol of a Non-Volatile Memory express (NVMe) interface standard.

Nevertheless, it should be understood that the disclosure is not limited to the above. The data transfer interface circuit 130 and the connection interface circuit 230 may also be compatible to a PATA (Parallel Advanced Technology Attachment) standard, an IEEE (Institute of Electrical and Electronic Engineers) 1394 standard, a Serial Advanced Technology Attachment (SATA) standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC interface standard, a UFS (Universal Flash Storage) interface standard, an eMCP interface standard, a CF interface standard, an IDE (Integrated Device Electronics) interface standard or other suitable standards. Further, in another embodiment, the connection interface circuit 230 and the storage controller 210 may be packaged into one chip, or the connection interface circuit 230 is distributed outside a chip containing the storage controller 210.

In this embodiment, the host memory 120 is configured to temporarily store commands executed by the processor 110 or data. For instance, in this exemplary embodiment, the host memory 120 may be a DRAM (Dynamic Random Access Memory), or a SRAM (Static Random Access Memory) and the like. Nevertheless, it should be understood that the disclosure is not limited in this regard, and the host memory 120 may also be other appropriate memories.

The storage unit 210 is configured to execute a plurality of logic gates or control commands, which are implemented in a hardware form or in a firmware form, and to perform operations of writing, reading or erasing data in the rewritable non-volatile memory storage module 220 according to the commands of the host system 10.

More specifically, the processor 211 in the storage controller 210 is a hardware with computing capabilities, which is configured to control overall operation of the storage controller 210. Specifically, the processor 211 has a plurality of control commands and the control commands are executed to perform various operations such as writing, reading and erasing data during operation of the storage device 20.

It should be noted that, in the embodiment, the processor 110 and the processor 211 are, for example, a central processing unit (CPU), a micro-processor, other programmable microprocessors, a digital signal processor (DSP), a programmable controller, an application specific integrated circuits (ASIC), a programmable logic device (PLD) or other similar circuit elements. The disclosure is not limited in this regard.

In an embodiment, the storage controller 210 further includes a ROM (not illustrated) and a RAM (not illustrated). More particularly, the ROM has a boot code, which is executed by the processor 211 to load the control commands stored in the rewritable non-volatile memory module 220 into the RAM of the storage controller 210 when the storage controller 210 is enabled. Then, the control commands are executed by the processor 211 to perform operations, such as writing, reading or erasing data. In another embodiment, the control commands of the processor 211 may also be stored as program codes in a specific area (for example, physical storage units in the rewritable non-volatile memory module 220 dedicated for storing system data) of the rewritable non-volatile memory module 220.

In this embodiment, as described above, the storage controller 210 further includes the data management circuit 212 and the memory interface control circuit 213. It should be noted that, operations performed by each component of the storage controller 210 may also be considered as operations performed by the storage controller 210.

The data management circuit 212 is coupled to the processor 211, the memory interface control circuit 213 and the connection interface circuit 230. The data management circuit 212 is configured to transmit data under instruction of the processor 211. For example, the data may be read from the host system 10 (e.g., the host memory 120) through the connection interface circuit 230, and the read data may be written into the rewritable non-volatile memory module 220 through the memory interface control circuit 213 (e.g., a writing operation performed according to the write command from the host system 10). As another example, the data may be read from one or more physical units of the rewritable non-volatile memory module 220 through the memory interface control circuit 213 (the data may be read from one or more memory cells in one or more physical units), and the read data may be written into the host system 10 (e.g., the host memory 120) through the connection interface circuit 230 (e.g., a reading operation performed according to a read command from the host system 10). In another embodiment, the data management circuit 212 may also be integrated into the processor 211.

The memory interface control circuit 213 is configured to perform the writing (or, programming) operation, the reading operation and the erasing operation for the rewritable non-volatile memory module 220 together with the data management circuit 212 under instruction of the processor 211.

For instance, the processor 211 may execute a write command sequence to instruct the memory interface control circuit 213 to write the data into the rewritable non-volatile memory module 220; the processor 211 can execute a read command sequence to instruct the memory interface control circuit 213 to read the data from one or more physical units (a.k.a. target physical unit) corresponding to the read command in the rewritable non-volatile memory module 220; the processor 211 can execute an erase command sequence to instruct the memory interface control circuit 213 to perform the erasing operation for the rewritable non-volatile memory module 220. Each of the write command sequence, the read command sequence and the erase command sequence may include one or more program codes or command codes, which are configured to perform the corresponding writing, reading and erasing operations on the rewritable non-volatile memory module 220. In an embodiment, the processor 211 may further send other types of command sequences to the memory interface control circuit 213 so as to perform corresponding operations on the rewritable non-volatile memory module 220.

In addition, the data to be written to the rewritable non-volatile memory module 220 is converted into a format acceptable by the rewritable non-volatile memory module 220 through the memory interface control circuit 213. Specifically, if the processor 211 is to access the rewritable non-volatile memory module 220, the processor 211 transmits a corresponding command sequence to the memory interface control circuit 213 to instruct the memory interface control circuit 213 to perform a corresponding operation. For example, the command sequences may include a write command sequence instructing to write data, a read command sequence instructing to read data, an erase command sequence instructing to erase data and corresponding command sequences instructing to perform various memory operations (e.g., changing a plurality of predetermined read voltage values of a predetermined read voltage set to perform a read operation, or performing a garbage collecting program and so on). The command sequences may include one or more signals, or data from the bus. The signals or the data may include command codes and program codes. For example, information such as identification codes and memory addresses are included in the read command sequence.

The rewritable non-volatile memory module 220 is coupled to the storage controller 210 (the memory control circuit unit 213) and configured to store data written from the host system 10. The rewritable non-volatile memory module 220 may be a SLC (Single Level Cell) NAND flash memory module (i.e., a flash memory module capable of storing one bit in one memory cell), an MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a QLC (Quadruple Level Cell) NAND flash memory module (i.e., a flash memory module capable of storing four bits in one memory cell), a 3D NAND flash memory module or a vertical NAND flash memory module, other flash memory modules so forth or any memory module having the same characteristics. The memory cells in the rewritable non-volatile memory module 220 are disposed in an array.

In this embodiment, the rewritable non-volatile memory module 220 has a plurality of word lines, wherein each word line among the word lines includes a plurality of memory cells. The memory cells on the same word line constitute one or more physical programming units (physical pages). In addition, a plurality of physical programming units may constitute one physical unit (a physical block or a physical erasing unit).

In this embodiment, one physical page is used as a minimum unit for writing (programming) data. The physical unit is a minimum unit for erasing (i.e., each physical unit includes a minimum number of memory cells to be erased together). Further, the address of each of the physical pages may also be referred to as physical address.

It should be noted that, in the embodiment, the system data configured for recording information of one physical block or a block string may be recorded by using one or more memory cells in the physical block, or recorded by using one or more memory cells of a specific physical block (also referred as system physical block) in one system region that is configured to record all of the system data.

Further, it should be understood that, when the processor 211 groups the memory cells (or the physical units) in the rewritable non-volatile memory module 220 for the corresponding management operations, the memory cells (or the physical units) are logically grouped and their actual locations are not changed.

The storage controller 210 assigns a plurality of logical units for the rewritable non-volatile memory module 220. The host system 10 accesses user data stored in a plurality of physical units through the assigned logical units. Here, each of the logical units may be composed of one or more logical addresses. For example, the logical unit may be a logical block, a logical page, or a logical sector. Each logical unit may be mapped to one or more physical units, wherein the physical unit may be one or more physical addresses, one or more physical sectors, one or more physical programming units, or one or more physical erasing units. In the present embodiment, the logical unit is a logical block, and the logical sub-unit is a logical page. Each logical unit includes a plurality of logical sub-units. In the embodiment, the address of the logical sub-unit may also be referred to as logical address.

Additionally, the storage controller 210 would create a logical-to-physical address mapping table and a physical-to-logical address mapping table for recording a mapping relation between the logical addresses assigned to the rewritable non-volatile memory module 220 and the physical addresses. In other words, the storage controller 210 can look up for the physical unit mapped by one logical address by using the logical-to-physical address mapping table, and the storage controller 210 can look up for the logical address mapped by one physical address by using the physical-tological address mapping table. Nonetheless, the technical concept for the mapping relation between the logical addresses and the physical addresses is a well-known technical means in the field, which is not repeated hereinafter. In typical operation of storage controller, the logical-to-physical address mapping table and the physical-to-logical address mapping table may be maintained in the buffer memory 216.

In this embodiment, an error checking and correcting circuit 214 is coupled to the processor 211 and configured to execute an error checking and correcting procedure to ensure correctness of data. Specifically, when the processor 211 receives the write command from the host system 10, the error checking and correcting circuit 214 generates an ECC (error correcting code) and/or an EDC (error detecting code) for data corresponding to the write command, and the processor 211 writes data corresponding to the write command and the corresponding ECC and/or the EDC into the rewritable non-volatile memory module 220. Then, when the processor 211 reads the data from the rewritable non-volatile memory module 220, the ECC and/or the EDC corresponding to the data are also read, and the error checking and correcting circuit 214 performs the error checking and correcting procedure on the read data based on the ECC and/or the EDC. In addition, after the error checking and correcting procedure is completed, if the read data is successfully decoded, the error checking and correcting circuit 214 can return an error bit value to the processor 211.

In an embodiment, the storage controller 210 further includes a buffer memory 216 and a power management circuit 217. The buffer memory 216 is coupled to the processor 211 and configured to temporarily store data and commands from the host system 10, data from the rewritable non-volatile memory module 220 or other system data for managing the storage device 20 so the processor 211 can rapidly access the data, the command or the system data from the buffer memory 216. The power management circuit 217 is coupled to the processor 211 and configured to control power of the storage device 20.

In the present embodiment, a garbage collection management circuit unit 215 includes a garbage collection execution circuit 2151 and a recycled block stripe recording circuit 2152. The garbage collection management circuit unit 215 is configured to receive a command from the processor 211 to execute a write command or a reprogramming operation. It should be noted that, in an embodiment, the garbage collection management circuit unit 215 may be integrated into the processor 211, so that the processor 211 can implement the data writing method provided by the embodiment. In addition, in another embodiment, the garbage collection management circuit unit 215 can also be implemented as a garbage collection management code module in the form of firmware or software, and accessed and executed by the processor 211 to implement the memory management method provided by the disclosure.

It should be noted that in the embodiment, the garbage collection operation is directed at one block stripe. The details of the block stripe will be explained below through FIG. 3.

Figure 3:
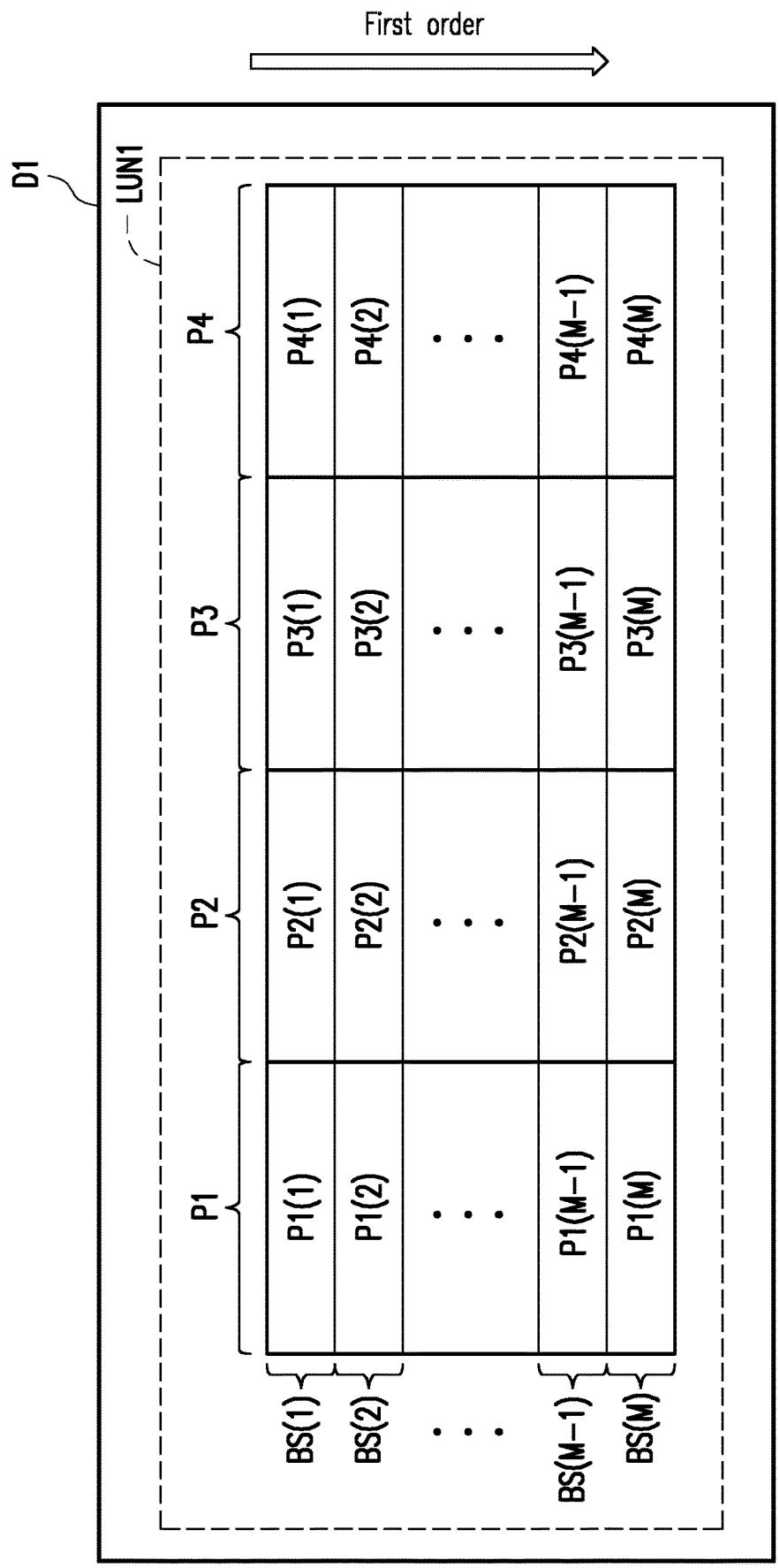
FIG. 3 is a schematic diagram illustrating a plurality of block stripes of a rewritable non-volatile memory module according to an embodiment of the disclosure.

FIG. 3 is a schematic diagram illustrating a plurality of block stripes of a rewritable non-volatile memory module according to an embodiment of the disclosure. Referring to FIG. 3, in the embodiment, the rewritable non-volatile memory module 220 may have a plurality of packages, each of the packages may have a plurality of physical blocks, and the plurality of physical blocks may be divided into N planes, and some or all of the planes may be logically divided into a logical unit number (LUN). For simplicity of explanation, it is assumed that the rewritable non-volatile memory module 220 has one package D1, and the package D1 has a plurality of physical blocks. The plurality of physical blocks are divided (grouped) into four planes P1 to P4 (N is equal to 4), wherein the four planes are divided into one logical number LUN1. In addition, each of the planes has M physical units arranged according to a first order. For example, plane P1 has M physical blocks P1(1)~P1(M); plane P2 has M physical blocks P2(1)~P2(M); plane P3 has M physical blocks P3(1)~P3(M); plane P4 has M physical blocks P4(1)~P4(M). In this embodiment, the physical blocks in the same order in each of the planes are grouped into one block stripe. For example, a block stripe BS(1) includes a physical block P1(1), a physical block P2(1), a physical block P3(1), and a physical block P4(1). That is to say, all the physical blocks in the above four planes may constitute M block stripes BS(1)~BS(M) arranged in the first order.

In this embodiment, the storage controller 210 sequentially writes data into a plurality of block stripes according to the order of the block stripes, and writes data according to the order of the planes P1 to P4 in the same block stripe. Assuming all the block stripes are empty, in order to write a written data that can fill four physical blocks, the storage controller 210 stores the written data into all physical blocks (e.g., physical block P1(1), physical block P2(1), physical block P3(1) and the physical block P4(1)) of the first empty block stripe from the first empty block stripe (block stripe BS(1) is used as an example) according to the first order. In another example, if the physical block P1(1) of the block stripe BS(1) is not available for storing the data, and other physical blocks are available for storing the written data, the storage controller 210 stores the written data into the physical block P2(1) of the block stripe BS(1), the physical block P3(1) and the physical block P4(1), and the physical block P1(2) of the block stripe BS(2).

In the embodiment, the garbage collection management circuit unit 215 (or the garbage collection execution circuit 2151) is configured to receive a command from the processor 211 to perform the garbage collection operation to one or more block stripes. The garbage collection management circuit unit 215 (or the recycled block stripe recording circuit 2152) is configured to record information corresponding to the one or more block stripes subjected to the garbage collection operation. The details of the data writing method provided in the embodiments of the disclosure and the functions of the storage controller 210 and the garbage collection management circuit unit 215 corresponding to the data writing method are described below with reference to a plurality of drawings.

Figure 2A:
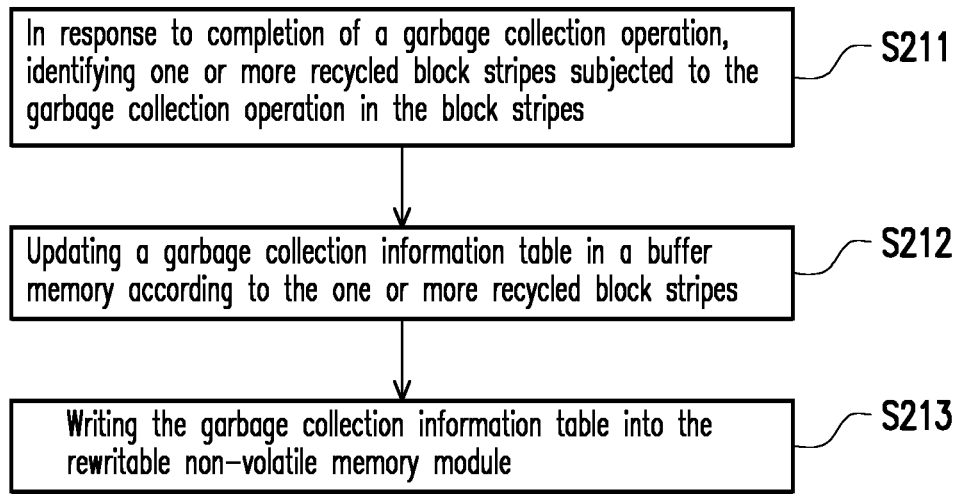
FIG. 2A is a flowchart diagram of a memory management method according to an embodiment of the disclosure.

FIG. 2A is a flowchart diagram illustrating a memory management method according to an embodiment of the disclosure. Referring to FIG. 1 and FIG. 2A, in step S211, in response to that the garbage collection execution circuit 2151 completes the garbage collection operation, the garbage collection management circuit unit 215 (or recycled block stripe recording circuit 2152) identifies one or more recycled block stripes subjected to the garbage collection operation.

Specifically, the processor 211 may record the valid data count values of the plurality of block stripes of the rewritable non-volatile memory module 220. When an empty block stripe has just been filled with data, the valid data count value of this block stripe is the largest. When the valid data count value of one block stripe is reduced and below a valid data threshold value (or when the invalid data count of one block stripe is higher than an invalid data threshold value), the processor 211 records a block stripe index value of this block stripe to prepare for performing a garbage collection operation to this block stripe (also referred to as a source block stripe). On a specific occasion, the processor 211 may instruct the garbage collection execution circuit 2151 to perform a garbage collection operation to the source block stripe described above, thereby copying the remaining valid data in the source block stripe to an available physical block. After the copying operation is completed, the garbage collection operation performed to this source block stripe is also completed. On this occasion, the remaining valid data of this source block stripe also becomes invalid data, and the source block stripe that completes the garbage collection operation may be referred to as a recycled block stripe. That is, the valid data initially stored in the recycled block stripe is recycled, and the currently stored data is invalid data. In other words, after completing the garbage collection operation performed to one or more block stripes, the one or more block stripes become one or more recycled block stripes, and the processor 211 identifies the block stripe index value (also referred to as recycled block stripe index value) of the one or more recycled block stripes. The block stripe index value (such as BS(1) mentioned above) of one block stripe may be used to allow each component of the storage controller 210 to identify the block stripe and a plurality of physical blocks in the block stripe. In addition, the block stripe index value may also be used to represent the position of the corresponding block stripe in the rewritable non-volatile memory module 220.

The processor 211 may reuse the recycled block stripe. Specifically, the processor 211 may perform an erase operation to the recycled block stripe on an appropriate occasion (e.g., when the storage device is idling), so that the physical block in the recycled block stripe becomes an empty physical block, and may be written with data. In addition, in an embodiment, the processor 211 may also select a recycled block stripe first to perform a write operation, and perform an erase operation to the recycled block stripe before writing the data corresponding to the write operation.

Next, in step S212, the garbage collection management circuit unit 215 (or the recycled block stripe recording circuit 2152) updates a garbage collection information table in a buffer memory according to the one or more recycled block stripes. Specifically, the garbage collection management circuit unit 215 (or the recycled block stripe recording circuit 2152) records the identified recycled block stripe index value to the garbage collection information table, and counts the total number of recycled block stripe index values recorded in the garbage collection information table. The construction of the garbage collection information table is described below with reference to FIG. 4.

Figure 4:
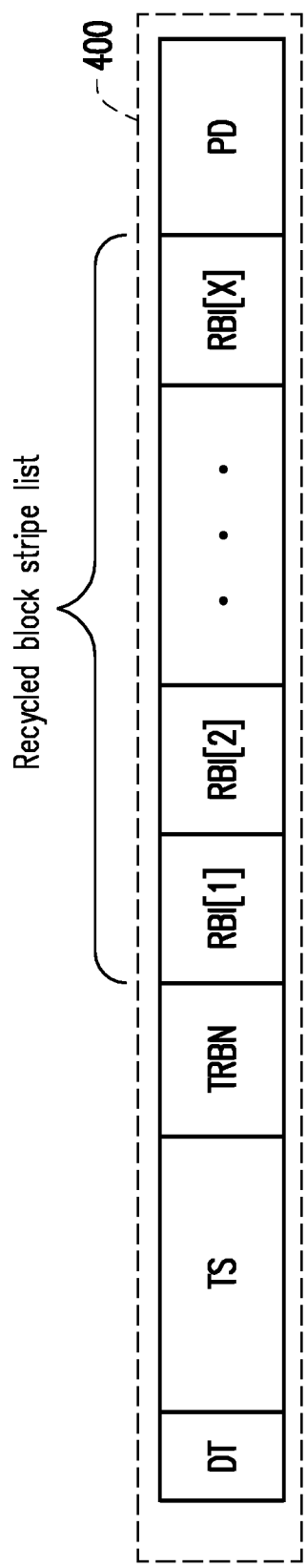
FIG. 4 is a schematic diagram illustrating a data structure of a garbage collection information table according to an embodiment of the disclosure.

FIG. 4 is a schematic diagram illustrating a data structure of a garbage collection information table according to an embodiment of the disclosure. Referring to FIG. 4, in the embodiment, a garbage collection information table 400 is maintained in the buffer memory 216. The garbage collection information table 400 mainly includes a recycled block stripe list and a total recycled block stripe number TRBN. The recycled block stripe list is used to record one or more recycled block stripe index values RBI[1]~RBI[X]. X is a positive integer. The total recycled block stripe number TRBN is used to record the total number of all of the recycled block stripe index values RBI[1]~RBI[X] in the recycled block stripe list, that is, when the number of recycled block stripe index values in the recycled block stripe list increases or decreases, the number of the recycled block stripes increases or decreases correspondingly.

The recycled block stripe index value added to the recycled block stripe list becomes the last recycled block stripe index value of the recycled block stripe list. When a recycled block stripe index value of the recycled block stripe list is deleted, all of the recycled block stripe index values arranged behind the deleted recycled block stripe index value is moved forward. For example, when the recycled block stripe index value RBI[1] is deleted, the recycled block stripe index values RBI[2]~RBI[X] behind the recycled block stripe index value RBI[1] is moved forward, that is, the recycled block stripe list is arranged from the recycled block stripe index value RBI[2] to the recycled block stripe index value RBI[X]. It should be noted that, on this occasion, the value recorded in the total recycled block stripe number TRBN is deducted by one. The size of the space occupied by the total recycled block stripe number TRBN may be set in advance, and the size of the space occupied by each of the recycled block stripe index values may be set in advance.

Please return to FIG. 2A first, after completing the operation of recording the identified one or more recycled block stripe index values to the recycled block stripe list in the garbage collection information table, the operation of updating the garbage collection information table is also completed. Thereafter, in step S213, the garbage collection management circuit unit 215 (or the recycled block stripe recording circuit 2152) instructs the memory interface control circuit 213 to write the garbage collection information table into the rewritable non-volatile memory module 220.

Referring to FIG. 4 again, specifically, in the embodiment, for the convenience of data management, the size of the garbage collection information table that is written into the rewritable non-volatile memory module 220 is a predetermined size. The predetermined size is, for example, the size of one physical page, and the disclosure is not limited thereto. Additionally, before writing to the rewritable non-volatile memory module 220, the garbage collection management circuit unit 215 (or the recycled block stripe recording circuit 2152) adds a data tag DT, a timestamp TS, and a padding data PD to the garbage collection information table.

The data tag DT is added to the forefront of the garbage collection information table 400, and the data tag DT is used to represent that the data tag DT and the plurality kinds of data behind the data tag DT are a garbage collection information table having a predetermined size. The size of the space occupied by the data tag DT may be set in advance.

The timestamp TS (also referred to as first timestamp) is used to represent the time point at which the garbage collection information table 400 is written into the rewritable non-volatile memory module 220. The disclosure provides no limitation to the form of the timestamp. For example, in an embodiment, the timestamp may reflect device time of the current storage device 20. In another example, in an embodiment, the storage controller 210 records a global timestamp, and this global timestamp is used according to the operation of the storage controller 210, to be allocated to data that needs timestamp. When the global timestamp is used/allocated, the count of the global timestamp is added by one or other appropriate value. In other words, by comparing the timestamps in the two data, it is possible to acquire the sequence of the time points at which the two data are processed. The size of the space occupied by the timestamp TS may be set in advance.

The padding data PD is used to make the size of the garbage collection information table 400 a predetermined size. Specifically, the garbage collection management circuit unit 215 (or the recycled block stripe recording circuit 2152) calculates the total space occupied by the data tag DT, the timestamp TS, the number of the recycled block stripes TRBN and the recycled block stripe list in the currently updated garbage collection information table 400, and the difference obtained by deducting the total space size from the predetermined size is used as the size of the padding data PD. In this manner, after the padding data PD is added to the garbage collection information table 400, the total size of the garbage collection information table 400 can be made to be the predetermined size.

At last, the garbage collection management circuit unit 215 (or the recycled block stripe recording circuit 2152) instructs the memory interface control circuit 213 to write the garbage collection information table 400 including the data tag DT, the timestamp TS, the total recycled block stripe number TRBN, the recycled block stripe list and the padding data PD into the rewritable non-volatile memory module 220. The above operation of writing the garbage collection information table 400 to the rewritable non-volatile memory module 220 may also be referred to as performing a snapshot operation to the garbage collection information table 400. In an embodiment, the garbage collection information table 400 is written to a system physical block in the rewritable non-volatile memory module 220.

It should be understood that the disclosure provides no limitation to the method of setting the bit values of the padding data PD. For example, the padding data PD may be generated using a random function. Or the padding data PD may be generated by using data having fixed aspect.

In the embodiment, other than updating the garbage collection information table in response to the performed garbage collection operation, it is also possible to determine whether to update the garbage collection information table according to the use of the block stripe. Another method for updating the garbage collection information table is described below with reference to FIG. 2B.

Figure 2B:
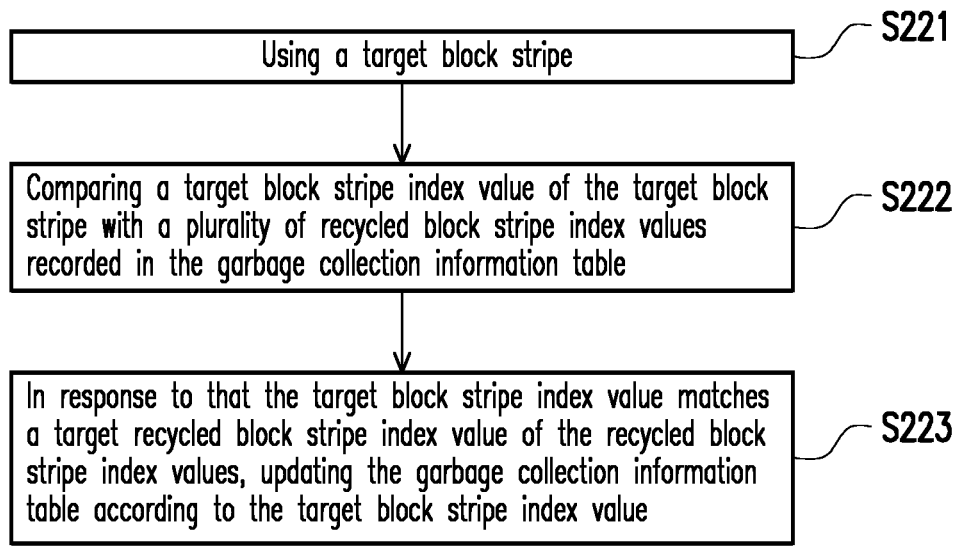
FIG. 2B is a flowchart diagram of a memory management method according to an embodiment of the disclosure.

FIG. 2B is a flowchart illustrating a memory management method according to an embodiment of the disclosure. Referring to FIG. 2B, in step S221, the processor 211 uses a target block stripe. Specifically, when the processor 211 is to perform a write operation or a data merging operation to write a data, the processor 211 may select one or more of the available block stripes (also referred to as target block stripe) among a plurality of available block stripes from the rewritable non-volatile memory module 220 to write the data. The selected target block stripe for writing the data may also be regarded as used target block stripe. The available block stripe includes a recycled block stripe, a free block stripe or an empty block stripe that has completed the garbage collection operation. In this embodiment, the processor 211 records a timestamp (also referred to as the block stripe timestamp) corresponding to the target block stripe to a system physical block according to the time point at which the target block stripe is selected for use. Alternatively, in another embodiment, the target block stripe inherently has a spare area to store meta data corresponding to the target block stripe, and the meta data may record the block stripe timestamp of the target block stripe.

Next, in step S222, the garbage collection management circuit unit 215 (or the recycled block stripe recording circuit 2152) compares the target block stripe index value of the target block stripe with the plurality of recycled block stripe index values recorded in the garbage collection information table. Specifically, the garbage collection management circuit unit 215 (or the recycled block stripe recording circuit 2152) identifies the block stripe index value (also referred to as the target block stripe index value) of the used target block stripe, and compares all of the recycled block stripe index values in the recycled block stripe list of the garbage collection information table according to the target block strip index value to find whether there is a recycled block stripe index value that matches/is equal to the target block stripe index value.

Next, in step S223, in response to that the target block stripe index value matches a target recycled block stripe index value of the plurality of recycled block stripe index values, the garbage collection management circuit unit 215 (or the recycled block stripe recording circuit 2152) updates the garbage collection information table according to the target recycled block stripe index value. Specifically, in response to that a recycled block stripe index value (also referred to as target recycled block stripe index value) of the plurality of recycled block stripe index values matches the target block stripe index value, the garbage collection management circuit unit 215 (or the recycled block stripe recording circuit 2152) deletes (removes) the recycled block stripe index value from the recycled block stripe list of the garbage collection information table. In addition, the recycled management circuit unit 215 (or the recycled block stripe recording circuit 2152) correspondingly updates the total recycled block stripe number TRBN (e.g., in the case where the number of deleted recycled block stripe index value is one, the value recorded in the total recycled block stripe number TRBN is deducted by one). In this manner, the operation of updating the garbage collection information table performed due to the use of the target block stripe is completed. It should be noted that after the update operation of such aspect is completed, the snapshot operation is not performed to the garbage collection information table currently maintained in the buffer memory 216.

On this occasion, since the updated garbage collection information table is only stored in the buffer memory 216, if a sudden power-off event (also referred to as a sudden power failure event) is occurred to the storage device, the garbage collection information table and other data stored in the buffer memory 216 will be lost. Accordingly, the garbage collection management circuit unit 215 may perform a recovery operation in response to the sudden power-off event in an attempt to restore the garbage collection information table existed before the sudden power-off event in the buffer memory 216.

Figure 5:
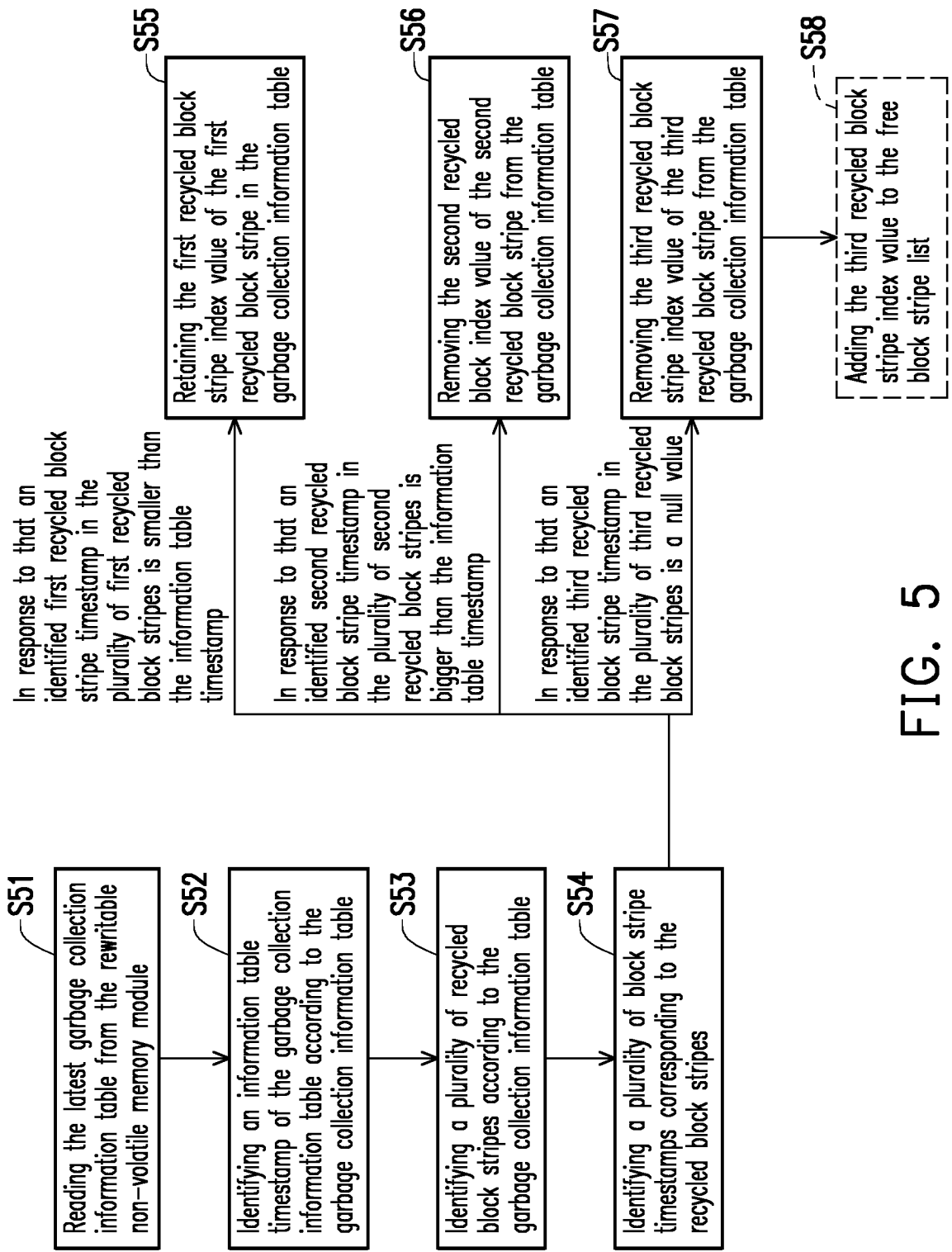
FIG. 5 is a flowchart diagram showing a recovery operation according to an embodiment of the disclosure.

FIG. 5 is a flowchart diagram illustrating a recovery operation according to an embodiment of the disclosure. Referring to FIG. 5, in step S51, the garbage recycled management circuit unit 215 (or the recycled block stripe recording circuit 2152) reads the latest garbage collection information table from the rewritable non-volatile memory module 220. Specifically, it is assumed that the system physical block of the rewritable non-volatile memory module 220 has stored a plurality of garbage collection information tables, the garbage recycled management circuit unit 215 (or the recycled block stripe recording circuit 2152) may identify the latest garbage collection information table from the plurality of garbage collection information tables according to the positions of the plurality of garbage collection information tables (for example, the garbage collection information table in which the physical address is in the last order is the latest garbage collection information table). Then, the garbage recycled management circuit unit 215 (or the recycled block stripe recording circuit 2152) reads the latest garbage collection information table from the rewritable non-volatile memory module 220 into the buffer memory 216. In an embodiment, the garbage recycled management circuit unit 215 (or the recycled block stripe recording circuit 2152) may identify the latest garbage collection information table according to the timestamps of the plurality of garbage collection information tables.

Then, in step S52, the garbage recycled management circuit unit 215 (or the recycled block stripe recording circuit 2152) identifies the information table timestamp of the read garbage collection information table according to the garbage collection information table. That is, the garbage recycled management circuit unit 215 (or the recycled block stripe recording circuit 2152) reads a first timestamp (i.e., information table timestamp) from the latest garbage collection information table.

Then, in step S53, the garbage recycled management circuit unit 215 (or the recycled block stripe recording circuit 2152) identifies a plurality of recycled block stripes according to the garbage collection information table. Specifically, the garbage recycled management circuit unit 215 (or the recycled block stripe recording circuit 2152) reads all of the recycled block stripe index values from the recycled block stripe list in the latest garbage collection information table to identify the plurality of corresponding recycled block stripes.

Then, in step S54, the garbage recycled management circuit unit 215 (or the recycled block stripe recording circuit 2152) identifies a plurality of block stripe timestamps corresponding to the plurality of recycled block stripes. For example, the garbage recycled management circuit unit 215 (or the recycled block stripe recording circuit 2152) reads a plurality of block stripe timestamps corresponding to a plurality of recycled block stripes from the system physical block according to the read recycled block stripe index value or the plurality of identified recycled block stripes.

Then, in step S55, the garbage recycled management circuit unit 215 (or the recycled block stripe recording circuit 2152) may compare the information table timestamp with the plurality of identified block stripe timestamps.

In response to that the first block stripe timestamp of the first recycled block stripe in the plurality of identified recycled block stripes is smaller than the information table timestamp, proceeding to step S56, the garbage recycled management circuit unit 215 (or the recycled block stripe recording circuit 2152) retains the first recycled block stripe index value of the first recycled block stripe in the garbage collection information table. That is, the garbage recycled management circuit unit 215 (or the recycled block stripe recording circuit 2152) does not delete the first recycled block stripe index value recorded in the recycled block stripe list in the garbage collection information table, wherein the block stripe timestamp of the first recycled block stripe corresponding to the first recycled block stripe index value is smaller than the information table timestamp.

On the other hand, in response to that the second block stripe timestamp of the second recycled block stripe in the plurality of identified recycled block stripes is larger than the information table timestamp, proceeding to step S57, the garbage recycled management circuit unit 215 (or the recycled block stripe recording circuit 2152) removes the second recycled block stripe index value of the second recycled block stripe from the garbage collection information table. That is, the garbage recycled management circuit unit 215 (or the recycled block stripe recording circuit 2152) deletes the second recycled block stripe index value recorded in the recycled block stripe list in the garbage collection information table, wherein the block stripe timestamp of the second recycled block stripe corresponding to the second recycled block stripe index value is larger than the information table timestamp.

In addition, in response to that a third block stripe timestamp of a third recycled block stripe in the plurality of identified recycled block stripes is a null value, proceeding to step S58, the garbage recycled management circuit unit 215 (or the recycled block stripe recording circuit 2152) removes the third recycled block stripe index value of the third recycled block stripe from garbage collection information table. That is, the garbage recycled management circuit unit 215 (or the recycled block stripe recording circuit 2152) deletes the third recycled block stripe index value recorded in the recycled block stripe list from the garbage collection information table, wherein the block stripe timestamp of the third recycled block stripe corresponding to the third recycled block stripe index value does not exist or is a null value.

In the embodiment, in the case where the block stripe timestamp of the third recycled block stripe corresponding to the third recycled block stripe index value does not exist or is a null value, the garbage recycled management circuit unit 215 (or the recycled block stripe recording circuit 2152) may determine that the third recycled block stripe has been subjected to the erase operation, thereby causing the block stripe timestamp of the third recycled block stripe to be deleted. Then, in an embodiment, step S58 is followed by step S59, the garbage recycled management circuit unit 215 (or the recycled block stripe recording circuit 2152) may notify the processor 211 to add the third recycled block stripe index value to the free block stripe list. The free block stripe list is maintained in the buffer memory 216, and the plurality of block stripes corresponding to the plurality of block stripe index values recorded in the free block stripe list are erased.

After all the block stripe timestamps are compared with the information table timestamp and the subsequent operations (e.g., steps S56, S57, S58) corresponding to the comparison result are also completed, the garbage recycled management circuit unit 215 (or the recycled block stripe recording circuit 2152) also completes the recovery operation.

It should be indicated that, in the above embodiment, since the garbage collection operation is directed at one or more recycled block stripes, the garbage collection information table records information corresponding to the one or more recycled block stripes. However, the disclosure is not limited thereto. For example, in another embodiment, the garbage collection operation is directed at one or more recycled physical blocks, and thus the garbage collection information table records information corresponding to the one or more recycled physical blocks.

In summary, the memory management method and the storage controller provided by the embodiments of the disclosure are capable of recording a recycled physical block subjected to the garbage collection operation into a garbage collection information table and writing the garbage collection information table into a rewritable non-volatile memory module only when in response to that the garbage collection operation is completed. Additionally, the memory management method and the storage controller are capable of only updating the garbage collection information table maintained in the buffer memory according to whether the plurality of recycled physical blocks recorded in the garbage collection information table are used without writing the garbage collection information table into the rewritable non-volatile memory module, thereby reducing the delay in storing data corresponding to the garbage collection operation. In addition, the memory management method may also perform a recovery operation when a power-off event occurs to restore the garbage collection information table. In this manner, the operation efficiency of the storage device may be improved.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A memory management method, adapted for a storage device equipped with a rewritable non-volatile memory module, wherein the rewritable non-volatile memory module has a plurality of physical blocks, wherein the physical blocks are grouped into a plurality of block stripes, the method comprising:
   in response to completion of a garbage collection operation, identifying one or more recycled block stripes subjected to the garbage collection operation in the block stripes;
   updating a garbage collection information table in a buffer memory according to the one or more recycled block stripes,
   wherein the garbage collection information table comprises:
   a recycled block stripe list, configured to record a plurality of recycled block stripe index values; and
   a total recycled block stripe number, configured to record the total number of all of the recycled block stripe index values in the recycled block stripe list; and
   writing the garbage collection information table into the rewritable non-volatile memory module.

2. The memory management method according to claim 1, wherein the garbage collection information table written into the rewritable non-volatile memory module comprises:
   a data tag, wherein the data tag is at the forefront of the garbage collection information table, and the data tag is used to indicate that the data tag and a plurality kinds of data behind the data tag are the garbage collection information table having a predetermined size,
   wherein the plurality kinds of data behind the data tag are sequentially a first timestamp, the total recycled block stripe number, the recycled block stripe list and a padding data,
   wherein the first timestamp is used to indicate a time point when the garbage collection information table is written into the rewritable non-volatile memory module,
   wherein the padding data is used to make the size of the garbage collection information table the predetermined size.

3. The memory management method according to claim 1, further comprising:
   using a target block stripe,
   comparing a target block stripe index value of the target block stripe with the plurality of recycled block stripe index values recorded in the garbage collection information table; and
   in response to that the target block stripe index value matches a target recycled block stripe index value of the recycled block stripe index values, updating the garbage collection information table according to the target block stripe index value.

4. The memory management method according to claim 1, wherein the step of updating the garbage collection information table in the buffer memory according to the one or more recycled block stripes comprises:
   adding a recycled block stripe index value of the one or more recycled block stripes to h recycled block stripe list in the garbage collection information table; and
   updating the total recycled block stripe number in the garbage collection information table according to the total number of the one or more recycled block stripes.

5. The memory management method according to claim 1, further comprising:
   performing a recovery operation corresponding to the garbage collection information table,
   wherein the recovery operation comprises:
   reading the latest garbage collection information table from the rewritable non-volatile memory module;
   identifying an information table timestamp of the read garbage collection information table according to the garbage collection information table;
   identifying a plurality of recycled block stripes according to the read garbage collection information table; and
   identifying a plurality of block stripe timestamps corresponding to the recycled block stripes,
   wherein in response to that a first block stripe timestamp of a first recycled block stripe in the identified recycled block stripes is smaller than the information table time stamp, retaining a first recycled block stripe index value of the first recycled block stripe in the garbage collection information table,
   wherein n response to that a second block stripe timestamp of a second recycled block stripe in the identified recycled block stripes is larger than the information table timestamp, removing a second recycled block index value of the second recycled block stripe from the garbage collection information table,
   wherein in response to that a third block stripe timestamp of a third recycled block stripe in the identified recycled block stripes is a null value, removing a third recycled block stripe index value of the third recycled block stripe from the garbage collection information table.

6. A storage controller for controlling a storage device equipped with a rewritable non-volatile memory module, the storage controller comprising:
   a connection interface circuit, coupled to a host system;
   a memory interface control circuit, coupled to the rewritable non-volatile memory module, wherein the rewritable non-volatile memory module has a plurality of physical blocks, wherein the physical blocks are grouped into a plurality of block stripes;
   a garbage collection management circuit unit; and
   a processor, coupled to the connection interface circuit, the memory interface control circuit, and the garbage collection management circuit unit,
   wherein the garbage collection management circuit unit is configured to, in response to completion of a garbage collection operation, identify one or more recycled block stripes subjected to the garbage collection operation in the block stripes;
   wherein the garbage collection management circuit unit is further configured to update a garbage collection information table in a buffer memory according to the one or more recycled block stripes, wherein the garbage collection information table comprises:
a recycled block stripe list, configured to record a plurality of recycled block stripe index values; and
a total recycled block stripe number, configured to record the total number of all of the recycled block stripe index values in the recycled block stripe list,
wherein the processor is configured to instruct the memory interface control circuit to write the garbage collection information table into the rewritable non-volatile memory module.

7. The storage controller according to claim 6, wherein the garbage collection information table written into the rewritable non-volatile memory module comprises:
a data tag, wherein the data tag is at the forefront of the garbage collection information table, and the data tag is used to indicate that the data tag and a plurality kinds of data behind the data tag are the garbage collection information table having a predetermined size,
wherein the plurality kinds of data are sequentially a first timestamp, the total recycled block stripe number, the recycled block stripe list and a padding data,
wherein the first timestamp is used to indicate a time point when the garbage collection information table is written into the rewritable non-volatile memory module,
wherein the padding data is used to make the size of the garbage collection information table the predetermined size.

8. The storage controller according to claim 6, wherein the processor uses a target block stripe,
wherein garbage collection management circuit unit compares a target block stripe index value of the target block stripe with the plurality of recycled block stripe index values recorded in the garbage collection information table,
wherein in response to that the target block stripe index value matches a target recycled block stripe index value of the recycled block stripe index values, the garbage collection management circuit unit updates the garbage collection information table according to the target block stripe index value.

9. The storage controller according to claim 6, wherein in the operation that the garbage collection management circuit unit is further configured to update the garbage collection information table in the buffer memory according to the one or more recycled block stripes,
the garbage collection management circuit unit adds a recycled block stripe index value of the one or more recycled block stripes to the recycled block stripe list in the garbage collection information table,
wherein the garbage collection management circuit unit updates the total recycled block stripe number in the garbage collection information table according to the total number of the one or more recycled block stripes.

10. The storage controller according to claim 6, wherein the processor further instructs the garbage recycled management circuit unit to perform a recovery operation corresponding to the garbage collection information table,
wherein the recovery operation comprises:
the garbage recycled management circuit unit reads the latest garbage collection information table from the rewritable non-volatile memory module;
the garbage recycled management circuit unit identifies an information table timestamp of the read garbage collection information table according to the garbage collection information table;
the garbage recycled management circuit unit identifies a plurality of recycled block stripes according to the read garbage collection information table; and
the garbage recycled management circuit unit identifies a plurality of block stripe timestamps corresponding to the recycled block stripes,
wherein in response to that a first block stripe timestamp of a first recycled block stripe in the identified recycled block stripes is smaller than the information table timestamp, the garbage recycled management circuit unit retains a first recycled block stripe index value of the first recycled block stripe in the garbage collection information table,
wherein in response to that a second block stripe timestamp of a second recycled block stripe in the identified recycled block stripes is larger than the information table timestamp, the garbage recycled management circuit unit removes a second recycled block index value of the second recycled block stripe from the garbage collection information table,
wherein in response to that a third block stripe timestamp of a third recycled block stripe in the identified recycled block stripes is a null value, the garbage recycled management circuit unit removes a third recycled block stripe index value of the third recycled block stripe from the garbage collection information table.

* * * * *